No. 720,722. PATENTED FEB. 17, 1903.
L. P. MEISTER.
THERMOSTAT FOR INCUBATORS.
APPLICATION FILED JAN. 2, 1902.
NO MODEL.
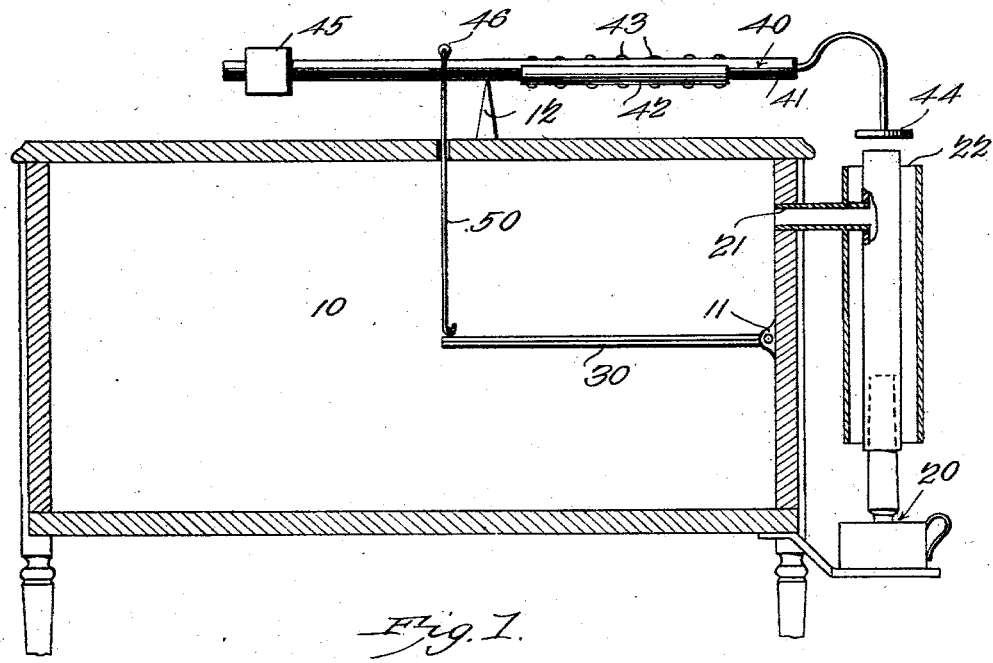
Fig. 1.
Fig. 2.
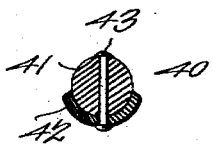
Witnesses
E. F. Stewart
S. M. McColl
L. P. Meister, Inventor.
by C. A. Snow & Co.
Attorneys

UNITED STATES PATENT OFFICE.

LOUIS P. MEISTER, OF TROY, MISSOURI.

THERMOSTAT FOR INCUBATORS.

SPECIFICATION forming part of Letters Patent No. 720,722, dated February 17, 1903.

Application filed January 2, 1902. Serial No. 88,201. (No model.)

*To all whom it may concern:*

Be it known that I, LOUIS P. MEISTER, a citizen of the United States, residing at Troy, in the county of Lincoln and State of Missouri, have invented a new and useful Thermostat for Incubators, of which the following is a specification.

This invention relates to thermostatic regulators especially designed for use in connection with incubators and brooders.

The object of the invention is to provide simple and efficient means for controlling the temperature inside an incubator, said means acting as soon as the outside temperature changes.

Another object is to provide automatic adjustment of the apparatus to meet the variations and differences of external atmospheric thermo changes without being affected by barometric changes of the external atmosphere; also, providing a regulating apparatus controlled partly by the internal thermal conditions and partly by external thermal conditions and practically non-responsive to barometric conditions.

Figure 1 of the accompanying drawings represents a longitudinal vertical section of an incubator, showing a side elevation of the improved regulating apparatus connected therewith and a heater for the incubator shown partly in section and part in side elevation. Fig. 2 represents a transverse section of the external thermostatic bar of the regulator.

The same reference-numerals indicate corresponding parts in both the figures.

In the form illustrated in the drawings an incubator 10 is shown provided with the usual heating-lamp 20, having a laterally-extending tube 21 leading to the interior of the incubator 10 and an opening 22 at its upper end.

This improved regulating apparatus comprises a thermostatic bar 30 of ordinary construction, preferably formed of two connected plates or bars of metal having different degrees of expansibility, an outer thermostatic lever 40, hereinafter specifically described, and a connecting bar or rod 50. The bar 30 is disposed in the incubator 10 and is shown fixed at one end to perforated ears 11 on the end of the incubator 10 and connected at its other end to the rod 50.

The external thermostatic bar or lever 40 is preferably composed of a wooden rod or bar 41, having a plate or bar 42 of hard rubber, preferably connected thereto by rivets, as 43, extending through the two members. It is necessary that this plate 42 be rigidly connected to the lever 40 at at least two points throughout its length, so that on the expansion of said member 42 the bar 40 will be drawn or buckled by the expanding member fixed thereto. Hard rubber has a high expansive capacity and expands immediately the temperature rises and being fixed to the wooden bar 41 causes said bar to buckle slightly, thereby raising the damper 44, attached to the outer end thereof, and moves it slightly away from its position over the heater-opening 22, thereby permitting a greater quantity of heat to pass out through said opening 22 and a less quantity to enter through the pipe 21, leading to the chamber 10. The bar 40 is supported on a knife-edge 12, attached to the top of the incubator 10, and is preferably provided with a sliding weight 45 for properly adjusting it. The lever 40 is also preferably provided with an eye 46, disposed between its fulcrum and its rear end, to which the upper end of the rod 50 is attached.

In the operation of this device when the parts are assembled, as shown in Fig. 1, a rise of temperature outside the incubator 10 causes the rubber plate 42 to expand and buckle the bar 41 slightly, thereby causing the damper 44 to rise for permitting the heat to pass out freely and reduce the temperature in the chamber 10 correspondingly. The lever 40 is so adjusted through the medium of its weight 45 and its position on the knife-edge 12 that a rise of 20° in the temperature will cause the damper 44 to rise about one-fourth of an inch. The higher the outside temperature rises the higher the damper will rise under the buckling action of the bar 41, caused by the expansion of the bar or plate 42, fixed thereon. Any change of temperature within the incubator 10 will be regulated by the thermostatic bar 30 therein, a rise in the temperature in said incubator causing the member thereof having the greater expansibility to expand and buckle the other member, thereby exerting a pulling-down action on the connecting-rod 50 and with it the rear end of the lever 40, thereby causing the front end of the lever to rise and with it the damper 44, thereby reducing the temperature in the chamber 10.

The lever 40 is very simple in construction and occupies only the space required by any ordinary lever, while at the same time it performs the double function of a lever and of a thermostat, doing away with the complicated system of thermostatic bars and levers heretofore in use.

I claim as my invention—

1. The combination of a casing, a heater mounted on the exterior of the casing and provided with one flue opening into the casing and having another flue opening to the atmosphere, an interiorly-arranged thermostat, an exteriorly-disposed lever fulcrumed between its ends and provided at one arm with a damper arranged to cover and uncover the flue opening to the atmosphere, a highly-expansive member fixed to the arm which is connected with the damper, an adjustable weight mounted on the other arm of the lever, and means for connecting the lever with the interiorly-arranged thermostat, substantially as described.

2. The combination of a casing, a heater arranged on the exterior of the casing and provided with a flue opening into the casing, said heater being also provided with a flue opening to the atmosphere, an interiorly-arranged thermostat mounted within the casing, a wooden bar or lever fulcrumed between its ends on the exterior of the casing and provided at one arm with a damper arranged to cover the flue opening to the atmosphere, a piece of hard rubber extending longitudinally of the arm having the damper and secured to the same at a plurality of points, and means for connecting the other arm of the bar or lever to the interiorly-arranged thermostat, substantially as described.

In testimony that I claim the foregoing as my own I have hereto affixed my signature in the presence of two witnesses.

LOUIS P. MEISTER.

Witnesses:
 ELMER F. BROWN,
 NIM. R. LONG.